W. B. VANSIZE.
TELEPHONE EXCHANGE.
No. 10,989. Reissued Mar. 5, 1889.
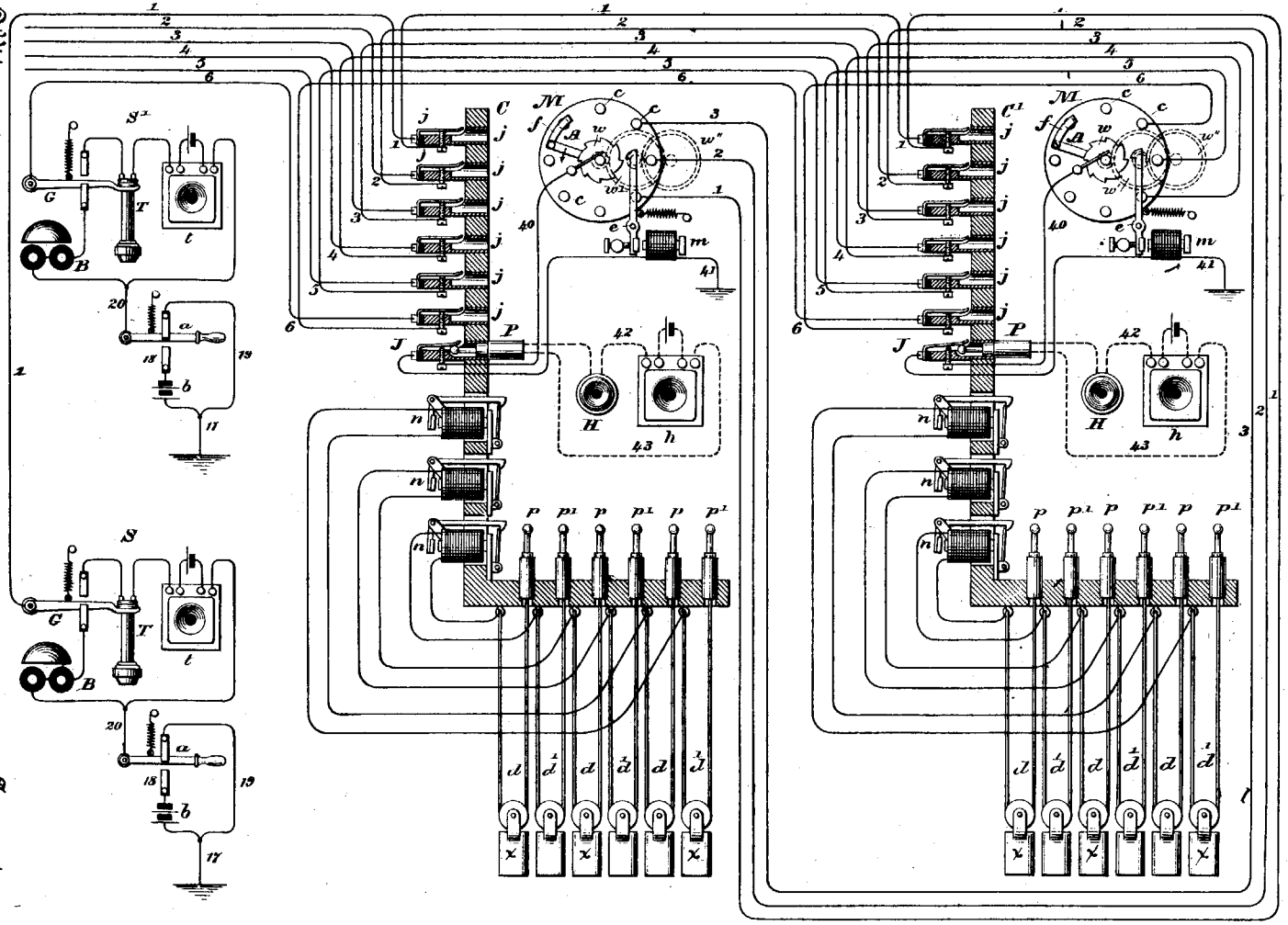
Witnesses.
Jno. W. Brock.
Carrie E. Ashley
Inventor,
William B. Vansize
THE NORRIS PETERS CO., PHOTO-LITHO., WASHINGTON, D. C.

UNITED STATES PATENT OFFICE.

WILLIAM B. VANSIZE, OF PLAINFIELD, NEW JERSEY.

TELEPHONE-EXCHANGE.

SPECIFICATION forming part of Reissued Letters Patent No. 10,989, dated March 5, 1889.

Original No. 393,529, dated November 27, 1888. Application for reissue filed January 22, 1889. Serial No. 297,221.

*To all whom it may concern:*

Be it known that I, WILLIAM B. VANSIZE, a citizen of the United States, and a resident of Plainfield, in the county of Union and State of New Jersey, have invented certain new and useful Improvements in Telephone-Exchanges, of which the following is a specification.

My invention is an improvement in telephone-exchanges.

The object of my invention is to simplify the apparatus required, to reduce the amount and the cost of apparatus, and to provide a simple, efficient, and expeditious means for determining whether a called-for line is in use or not.

I have chosen to describe and illustrate my improvements as applied to a multiple-board arrangement of central-station apparatus.

In my arrangement at the central station all the sub-station wires are normally open. There is the usual arrangement of duplicate boards, upon each and every one of which each and every sub-station line has a spring-jack connection. I call this the "aggregate number" of circuits, and I denominate the subdivision of this number of circuits assigned to an individual operator "a group." It has been customary to place an annunciator in each circuit of a group and to drop this annunciator and wait for the operator to insert a telephone and respond whenever it was desired to communicate. A second arrangement has been used, known as the "Law system," in which the annunciators were dispensed with and a "call-wire" used, the call-wire being common to a series of sub-stations. Both plans noted have some objectionable features, and require supplemental devices to determine the question whether or not a called-for line is in use.

My improvement consists in placing a series of fixed insulated contact-points equal in number to the number of circuits in a group in close proximity to each board. These points I prefer to arrange in a circle, and at the center I place a rotating radial arm. This arm is upon a constantly-rotating shaft, which also bears a wheel having a series of teeth, one for each contact-point. I connect this arm to ground through a fragment of conductor containing an electro-magnet and a head telephone. Each fixed contact-point forms the normally-open terminal of one circuit of a group, and the radial arm in its rotation completes the circuits of each sub-station line in succession through the magnet and telephone at the central station. This magnet has an armature-bar bearing a hook or catch taking into the toothed wheel. At each sub-station is a battery and a switch for including it in the line. If this battery be included in circuit at a sub-station, the instant the radial arm at the central station in the course of its rotation makes contact with the contact forming the terminal of that particular line, the electro-magnet will be operated, and its armature-bar will catch and hold the rotating arm in that position until released. The operation of thus completing the circuit will be announced at the sub-station by a "click" in the telephone, hearing which the sub-station instantly knows that he is in communication with the central station, and therefore announces his own number and the number of the desired sub-station. The central-station operator then places the head telephone in connection with the called-for station line. Now, if that line is in its normal condition, the rotating arm of the group to which it belongs will, in its rotation, when making contact therewith, sound an audible signal in the head telephone, such as a click, caused by completing the circuit; but if the called-for wire is in use the signal will not be heard, as the act of connecting two circuits disconnects both from their normal terminal contacts. Having determined the question of line in use or not, the operator again returns the head telephone to its normal position in connection with the radial arm. Assuming that the called-for line was found idle, the operator takes up two jack-plugs united by a flexible cord, including a ring-off annunciator, and inserts them in the jacks of the calling and called-for line, respectively. The insertion of the plug opens both lines in the jacks and cuts off connection with the rotating radial arms, when in every case, the arm of the calling line having been stopped, it immediately resumes its rotary movement and thus continues until again stopped.

The accompanying drawing illustrates my invention.

C C′ are two duplicate switch-boards located at the central station and connecting with sub-stations S S′, &c., through the medium of a series of electrical conductors, 1 2 3, &c., the circuit of each of which may be completed by the earth or return-conductor. Each conductor has a spring-jack, *j*, on each board C C′, &c. A subdivision of the aggregate number of circuits terminates in a series of fixed contact-points, *c c*, located in close proximity to each board. These points are preferably arranged in the circumference of a circular section of insulating material, M. At the center of M is placed a radial arm of conducting material, A, having a flexible terminal or trailer, *f*, in position to make contact periodically and successively with the series of contact-points *c*. Fixed to the same shaft or arbor with arm A is a toothed wheel, *w*. The teeth in the wheel and the contacts *c* in the circumference of the circle are equal in number and correspond in radial position. The arm A and wheel *w* are motor-driven, the movement being equalized and regulated by power-driven intermediate wheels, *w′ w″*, in a well-known manner. A fragment of conductor 40 41 connects this radial arm A with the earth. Included in the fragment 40 41 is a special spring-jack, J, and an electro-magnet, *m*. This magnet *m* has a hooked armature-bar, the said hook being in position to engage with any tooth of wheel *w* whenever the magnet is energized by an electrical current. A head telephone, H, and a suitable transmitter, *h*, have their terminals connected to a jack-plug, P, and may be included in the fragment of conductor 40 41 by inserting plug P in jack J; or plug P may be inserted in any of the series of jacks *j* for the purpose of including head telephone H in any circuit 1 to 6. Flexible cords *d d′* are connected to terminal spring-jack plugs *p p′* through ring-off annunciators *n*. The cords are held in the position shown by a pulley-weight, *x*, called a "gravity take-up."

At the sub-stations S S′ there is the usual arrangement of gravity-switch, G, receiving-telephone T, and transmitter *t* in a telephone-branch, and the call-bell B in the bell-branch. In place of a magneto-bell I use a constant-current generator, as one or two cells of battery *b*, and a hand-switch, *a*, for including or excluding it with respect to the main line. When switch *a* is in its normal position, circuit is *via* the conductor 20, *a*, 19, and 17. When lever *a* is depressed, circuit is *via* 20, *a* 18, *b*, and 17.

The operation is as follows: We will assume the entire apparatus to be in the position shown and that arms A are constantly rotating in the direction shown by the arrow. Station S desires to communicate with a distant station, S′. Station S depresses arm *a*, circuit passing *via* elements 17, *b*, 18, *a*, 20, bell B G, line *l*, jacks *j j* on C C′, and terminates in the open contact-point *c* on disk M, near board C. Circuit is open, but immediately arm A in its rotation strikes contact *c* of line-wire *l*, circuit is completed *via f*, A, 40, J, P, 42, 43, including H and *h*, magnet *m*, and conductor 41 to earth. The magnet *m* is energized and attracts its armature, bringing the hooked armature-bar *e* into engagement with wheel *w*, which instantly stops, *f* remaining in contact with line *l*. Sub-station S hears a stroke on bell B, which he understands to be the completion of his circuit, and he knows that he has the exclusive attention of the central-station operator. If the sub-station has removed his telephone, he hears the stroke or click in his telephone instead of on the bell. In either case he immediately announces the number of his own station and that of the station with which communication is desired, which the central-station operator receives upon head telephone H. Sub-station S retains lever *a* in a depressed position until he hears the called-for station. The central station removes plug P from jack J and inserts it in the jack of the called-for line to ascertain whether said line is in use or idle. If the line is idle, there will be heard a click in the telephone, caused by the arm A at board C′, completing the circuit of line 6, which it should do once every two seconds. If no sound is heard, it is an indication that the called-for line is severed at some point outside the terminal *c*, which would be the case if a jack-plug had been inserted in any jack *j* in said circuit 6. Assuming that the circuit was not in use, the operator inserts plugs *p p′* into the circuit of the calling and the called-for stations, respectively, thus joining said two circuits into one, cutting off connection with the contact-points *c c*, and including a "ring-off" annunciator in the connected circuit. The sub-station releases the switch-arm and the battery is withdrawn. The arm A of the calling-station group has been released and the central-station operator returns the head telephone H to the line fragment 40 41, ready to receive the next call.

What I claim, and desire to secure by Letters Patent, is—

1. The combination, in a telephone-exchange, of a central station and a series of sub-stations, a series of electrical conductors uniting said central station and sub-stations, telephonic instruments at each station for the purpose of intercommunication, switching apparatus at the central station for connecting said conductors in pairs, and an automatic switch at the central station making and breaking connection with each of said conductors periodically.

2. The combination of a central station and a series of sub-stations, a series of electrical conductors uniting the sub-stations with the central station, a switch-board at the central station containing a series of spring-jacks, one for each of said conductors, a series of flexible conducting cords and plugs for electrically uniting the spring-jacks in pairs, a series of circumferentially-arranged fixed contact-points, each forming the terminal of one of said conductors, and a rotating radial arm forming the terminal of a fragment of conductor containing a receiving-telephone, said arm forming contact with each of said fixed contacts successively.

3. The combination of a central station and a series of sub-stations, a series of electrical conductors uniting said sub-stations with said central station, a switch-board at the central station containing a series of spring-jacks, one for each of said conductors, a series of flexible conducting cords and plugs for electrically uniting the spring-jacks in pairs, a series of fixed contact-points, each forming the terminal of one of said conductors, a movable contact-point forming the terminal of a fragment of conductor, a receiving-telephone located in said conductor fragment, and means for imparting a progressive movement to said contact-point, whereby the said movable contact point is carried into connection with each of said fixed contact-points periodically and successively.

4. The combination of a central station and a series of sub-stations, a series of electrical conductors uniting said sub-stations with said central station, a switch-board at the central station containing a series of spring-jacks, one for each of said conductors, a series of flexible conducting cords and plugs for electrically uniting the spring-jacks in pairs, a series of circumferentially-arranged fixed contact-points, each forming the terminal of one of said conductors, a rotating radial arm located upon a suitable bearing, a toothed wheel fixed to said arm and rotating therewith, a fragment of conductor connected to said arm, an electro-magnet having its coils included in said fragment of conductor, a hooked armature-bar therefor to catch and hold the arm and wheel, and a receiving-telephone located in said fragment of conductor, all arranged and operating substantially as described.

5. The combination of a central station and a series of sub-stations, a series of electrical conductors uniting said sub-stations with said central station, two or more duplicate switch-boards at the central station, upon each of which each of said conductors has an electrical connection, suitable switching devices at each board for uniting the conductors in pairs, and in close proximity to each board a separate subdivision or group of said conductors connected to a series of fixed contact-points, a movable contact forming the terminal of a fragment of conductor containing a receiving-telephone, and means for imparting a progressive movement to said movable contact, whereby the said movable contact is carried into connection with each of said fixed contacts periodically and successively.

WILLIAM B. VANSIZE.

Witnesses:
V. C. SCHAUMBURG,
F. D. L. WALKER.